US00RE50863E

(19) United States
(12) Reissued Patent
Peterson

(10) Patent Number: US RE50,863 E
(45) Date of Reissued Patent: Apr. 14, 2026

(54) RIFLE CARTRIDGE WITH IMPROVED BULLET UPSET AND SEPARATION

(71) Applicant: Federal Cartridge Company, Anoka, MN (US)

(72) Inventor: Bryan P. Peterson, Isanti, MN (US)

(73) Assignee: Federal Cartridge Company, Anoka, MN (US)

(21) Appl. No.: 18/606,028

(22) Filed: Mar. 15, 2024

Related U.S. Patent Documents

Reissue of:
(64) Patent No.: 11,280,595
Issued: Mar. 22, 2022
Appl. No.: 16/736,309
Filed: Jan. 7, 2020

U.S. Applications:
(63) Continuation of application No. 15/876,186, filed on Jan. 21, 2018, now Pat. No. 10,551,154.

(60) Provisional application No. 62/448,776, filed on Jan. 20, 2017.

(51) Int. Cl.

| | |
|---|---|
| ***F42B 5/02*** | (2006.01) |
| ***F42B 5/067*** | (2006.01) |
| ***F42B 10/22*** | (2006.01) |
| ***F42B 10/46*** | (2006.01) |

(Continued)

(52) U.S. Cl.
CPC ..... *F42B 5/025* (2013.01); *F42B 5/067* (2013.01); *F42B 10/22* (2013.01); *F42B 10/46* (2013.01); *F42B 12/367* (2013.01); *F42B 12/78* (2013.01)

(58) Field of Classification Search
CPC ..... F42B 5/025; F42B 10/22; F42B 12/78
See application file for complete search history.

(56) References Cited

U.S. PATENT DOCUMENTS

| | | | |
|---|---|---|---|
| RE1,410 | E | 2/1863 | Lindner |
| 1,049,419 | A | 1/1913 | Swett |
| 1,135,357 | A | 4/1915 | Clyne |

(Continued)

FOREIGN PATENT DOCUMENTS

| | | |
|---|---|---|
| AT | 264322 | 8/1968 |
| AT | 334787 | 2/1977 |

(Continued)

OTHER PUBLICATIONS

"Russian Handgun Ammo With Steel Forward Portion" downloaded from the internet at: https://www.ar15.com/forums/general/Why_not_make_some_legal_handgun_AP_to_get_the_BATFE_back_for_7N6_and_M855_Results_on_pgs_4_5_and_6/5-721610/&page=3 (8 pages).

(Continued)

*Primary Examiner* — Matthew J Kasztejna
(74) *Attorney, Agent, or Firm* — Christensen, Fonder, Dardi & Busse PLLC; Timothy J. Busse

(57) ABSTRACT

A rifle cartridge with a bullet has desirable penetration capabilities and controlled separation of components upon terminal impact. In embodiments of the invention, the bullet comprises a forward component, a lead core, and a copper jacket. The lead jacket having a leading edge portion that extends to the cylindrical mid portion. The forward component may have a forward pointed ogive portion, a cylindrical mid portion, a mid ogive portion, and a pair of cylindrical portions separated by an annular groove. The jacket having a cannelure at the annular groove and the casing upper lip crimped into the cannelure.

19 Claims, 10 Drawing Sheets

(51) Int. Cl.
*F42B 12/36* (2006.01)
*F42B 12/78* (2006.01)

(56) References Cited

U.S. PATENT DOCUMENTS 1,243,857 A 10/1917 Muenzenmaier
1,376,530 A 5/1921 Greener
1,493,614 A 5/1924 Dickerson
1,709,414 A 4/1929 Stendebach
1,767,308 A 6/1930 Phillips
1,903,657 A 4/1933 Reed
1,967,416 A 4/1933 Leussler
1,944,884 A 1/1934 Gerlich
2,045,964 A 6/1936 Rinkel
2,345,619 A 4/1944 Moore
2,792,618 A 5/1957 Walker
2,958,287 A 11/1960 Auxier
3,003,420 A * 10/1961 Nosler ..... F42B 12/34 102/508
3,069,748 A 12/1962 Nosler
3,142,256 A 7/1964 Mack
3,154,016 A 10/1964 Frey
3,164,092 A 1/1965 Reed et al.
3,173,371 A 3/1965 Manshel
3,230,886 A 1/1966 Woodring
3,282,214 A 11/1966 Briscoe
3,357,357 A 12/1967 Voss
3,442,205 A 5/1969 Stadler et al.
3,442,216 A 5/1969 Six et al.
3,616,758 A 11/1971 Kamarov
3,680,485 A 8/1972 Zaid
3,720,170 A 3/1973 Godfrey
3,756,158 A 9/1973 Anderson
3,776,136 A 12/1973 Dix et al.
3,939,773 A 2/1976 Jenkins et al.
4,112,846 A 9/1978 Gilbert et al.
4,128,059 A 12/1978 Black
4,517,897 A * 5/1985 Kneubuhl ..... B21K 1/025 102/439
4,517,898 A 5/1985 Davis et al.
4,619,203 A 10/1986 Habbe
4,644,866 A 2/1987 Sullivan
4,753,172 A 6/1988 Katzmann
4,777,883 A 10/1988 Chevich
4,878,434 A * 11/1989 Sommet ..... F42B 12/78 102/514
4,884,508 A 12/1989 Kruse et al.
5,094,169 A 3/1992 Evitts
5,175,392 A 12/1992 Denis
5,206,024 A 4/1993 Peery et al.
5,259,320 A 11/1993 Brooks
5,388,524 A 2/1995 Strandli et al.
5,454,325 A 10/1995 LeBlanc
5,621,186 A 4/1997 Carter
5,794,320 A 8/1998 Wernz et al.
5,811,723 A 9/1998 Stone
5,943,749 A 8/1999 Swank
6,085,661 A 7/2000 Halverson et al.
6,148,731 A * 11/2000 Winter ..... F42B 12/34 102/501
6,305,293 B1 10/2001 Fry et al.
6,374,743 B1 4/2002 Hug et al.
6,439,125 B1 8/2002 Carter
D472,600 S 4/2003 Dehaan
6,546,875 B2 4/2003 Vaughn et al.
6,629,485 B2 10/2003 Vaughn et al.
6,817,299 B1 11/2004 Cooke
D500,952 S 1/2005 Moore
6,837,165 B2 1/2005 Eberhart et al.
6,862,993 B1 3/2005 Cudazzo
6,971,315 B2 12/2005 Knappworst et al.
6,973,879 B1 12/2005 McElroy et al.
7,150,233 B1 12/2006 Eberhart
7,487,727 B2 2/2009 Eberhart et al.
7,607,394 B2 10/2009 Cesaroni
7,748,325 B2 7/2010 Marx
7,847,253 B2 12/2010 Carey et al.
D646,179 S 10/2011 Jansen
8,082,850 B2 12/2011 Marx
8,087,359 B2 * 1/2012 Sauvestre ..... F42B 12/34 102/439
8,267,015 B2 9/2012 Marx
D686,921 S 7/2013 Odobescu
8,776,424 B2 7/2014 Mirabile
8,857,343 B2 * 10/2014 Marx ..... F42B 12/02 102/501
9,121,677 B2 9/2015 Emary
D740,914 S 10/2015 Nattrass
9,157,713 B1 10/2015 Peterson et al.
9,255,775 B1 * 2/2016 Rubin ..... F42B 12/34
D751,167 S 3/2016 Chua et al.
9,273,941 B2 3/2016 Carlson et al.
9,329,003 B2 5/2016 Peterson et al.
D759,189 S 6/2016 Pederson et al.
9,360,287 B2 6/2016 Emary
9,377,277 B1 6/2016 Worrell, Jr. et al.
9,395,163 B2 7/2016 Fritz
D768,802 S 10/2016 Bowers
9,470,494 B2 10/2016 Marx
D780,876 S 3/2017 Boatright
D781,394 S 3/2017 Bowers
9,797,696 B2 10/2017 Golloher et al.
D813,974 S 3/2018 Peterson
D813,975 S 3/2018 White
10,041,773 B2 8/2018 Peterson
D832,718 S 11/2018 Aboabdo
D848,569 S 5/2019 Peterson
10,551,154 B2 * 2/2020 Peterson ..... F42B 10/22
2002/0178963 A1 12/2002 Halverson
2005/0066844 A1 * 3/2005 Eberhart ..... F42B 12/34 102/510
2005/0126422 A1 6/2005 Lamm
2006/0278117 A1 12/2006 Emary
2007/0017409 A1 * 1/2007 Mansfield ..... F42B 12/08 102/518
2008/0156222 A1 7/2008 Orlanov
2009/0293754 A1 12/2009 Riess et al.
2010/0224093 A1 9/2010 Wilhelm
2014/0326157 A1 11/2014 Conroy et al.
2014/0326158 A1 11/2014 Fritz
2015/0083011 A1 3/2015 Emary
2016/0091289 A1 3/2016 Peterson
2016/0273896 A1 9/2016 Emary
2017/0052008 A1 2/2017 Peterson
2018/0209768 A1 7/2018 Peterson
2018/0364017 A1 12/2018 Peterson et al.

FOREIGN PATENT DOCUMENTS

CZ 20001900 A3 * 11/2001 ..... F42B 12/34
DE 370908 3/1923
DE 583097 8/1933
DE 2223212 11/1973
DE 2535704 2/1977
DE 36 38 721 5/1987
DE 3802002 8/1989
DE 38401165 * 7/1990 ..... F42B 12/34
DE 4024543 2/1992
DE 9301706 U1 6/1993
DE 19711344 9/1997
DE 10045009 5/2001
DE 10211094 11/2002
DE 20320679 * 12/2004 ..... F42B 12/34
DE 102011108758 1/2013
DE 102012023398 A1 * 6/2014 ..... F42B 12/74
EP 0225532 6/1987
EP 1222436 A1 * 7/2002 ..... F42B 12/34
FR 1166011 11/1958
FR 1240110 9/1960
FR 2202275 5/1974
FR 2356906 1/1978
FR 2428229 1/1980
FR 2540239 8/1984

(56) References Cited

FOREIGN PATENT DOCUMENTS

| | | | |
|---|---|---|---|
| FR | 2662789 | | 12/1991 |
| FR | 2802296 | | 6/2001 |
| FR | 2865272 | | 7/2005 |
| GB | 3921 | | 11/1905 |
| GB | 9876 | | 1/1908 |
| GB | 8301 | | 4/1910 |
| GB | 115476 | | 5/1918 |
| GB | 6588 | | 1/1987 |
| RU | 2003033 | | 11/1993 |
| RU | 2413169 | C1 | 2/2011 |
| WO | 9720185 | | 6/1997 |
| WO | 01/18483 | | 3/2001 |
| WO | 01/20244 | | 3/2001 |
| WO | 02086412 | | 10/2002 |
| WO | 2004085953 | | 10/2004 |

OTHER PUBLICATIONS

"Can the new "green" M855A EDPR defeat steel armor when fired from a short barrel?" [online]. The Chopping Block. [Published on Aug. 5, 2016]. Retrieved from the Internet: <https://www.youtube.com/watch?v=QItA83cPpS4>.

"Ammunition 7×57". Boris Barowski. [Published on Sep. 15, 2007]. Retrieved from the internet: <https://commons.widimedia.org/wiki/File:Ammunition_7x57.jpg>.

Notification of Transmittal of the International Search Report and the Written Opinion of the International Searching Authority, or the Declaration for PCT/US18/14738, dated Apr. 25, 2018. 13 pages.

"Before 2014" SP-10 armor piercing pistol ammunition downloaded from the internet at http://modernfirearms.net/ammunition/russian-special-cartridges-e.html.

"U.S. Army Places Huge Order for New M855A1 Ammo" downloaded from the internet at http://bulletin.accurateshooter.com/tag/m855a1/ (Oct. 26, 2010).

Machine Translation of DE 100 45 0009 A1 to Dynamit Nobel (Year: 2001).

U.S. Pat. No. D. 682,364, Sep. 10, 1901, Mangon (cited here because the patent section of this form-fillable will not accept this patent number).

U.S. Pat. No. Re. 40,153, Oct. 6, 1863, Billings (cited here because the patent section of this form-fillable will not accept this patent number).

U.S. Pat. No. Re. 29,272, Jul. 24, 1860, Hotchkiss (cited here because the patent section of this form-fillable will not accept this patent number).

U.S. Pat. No. Re. 36,197, Aug. 12, 1862, Shaler (cited here because the patent section of this form-fillable will not accept this patent number).

U.S. Pat. No. D. 693,329, Feb. 11, 1902, Neubauer (cited here because the patent section of this form-fillable will not accept this patent number).

* cited by examiner 55
112
102
101
105
62
60
113
106
116
120
117
44

55
115
57
102
102
105
62
44
120
106
116
117

55
57
112
105
44
113
106
116
117
120

RIFLE CARTRIDGE WITH IMPROVED BULLET UPSET AND SEPARATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application is a continuation of U.S. patent application Ser. No. 15/876,186 filed Jan. 21, 2018, which claims priority to U.S. Provisional Application No. 62/448,776 filed Jan. 20, 2017 to Bryan P. Peterson, entitled "Cartridge With Improved Penetration And Expansion Bullet," which are incorporated herein by reference.

FIELD OF THE INVENTION

The present invention is generally relates to cartridges and bullets. More particularly, to a rifle cartridge comprising a case with a jacketed bullet that separates into predefined portions at impact with a jacketed bullet and a forward nose component.

BACKGROUND OF THE INVENTION

Several means have been utilized for increasing the stopping power and/or lethality of bullets. For hunting, personal protection, and law enforcement, bullets are often designed to mushroom upon impact with a target thereby maximizing the energy transfer of the bullet to the target. Generally, these bullets are designed to keep the bullet intact, that is, in one piece, after entering the target. Other bullets, particularly for military use, where the use of mushrooming bullets are controlled or prohibited by international treaties, bullets, particularly rifle bullets, are often designed to tumble, separate, and/or fragment into separate pieces to maximize the energy transfer. Consistently controlling this tumbling, separation, and/or fragmenting has been problematic. For example, the yaw state of the bullet upon target entry can dramatically affect the resulting tumbling, separation, and/or fragmentation. Any improvement in consistency in either such tumbling, separation, and/or fragmentation without negatively affecting other positive attributes of bullets, such as accuracy and range, would be welcomed by the industry. And, improvements in accuracy are always welcome.

SUMMARY OF THE INVENTION

A rifle cartridge with an improved bullet has desirable penetration capabilities and controlled and enhanced separation of components upon terminal impact. The bullet having in embodiments, an aspect ratio of length to maximum diameter of 3.5 or greater. In embodiments the bullet comprises a forward unitary component formed a generally non-malleable material, one or more malleable cores behind it, and a jacket that extends forward containing the cores and tapering conformingly around a tapering portion of the forward component. The leading edge of the jacket spaced rearwardly from a forward tip of the bullet and having a taper opposite that of the tapering portion of the forward component, thereby providing an annular concave scoop facilitating upset of the jacket upon impact with a fluidic target.

A feature and advantage of embodiments is a rifle cartridge configured for firing in a modern sporting rifle, such as an AR15, that has a barrel sized for bullets larger than conventional 5.56 mm, and that has the bullet sized and propellant configured for limiting the bullet speed to subsonic velocities, and that provides jacket upset and bullet component separation at increased ranges over conventional ammunition. In embodiments, a 300 BLK cartridge, has a jacket terminating at a forward tapering portion of the bullet with a forward jacket edge defining one or more forward facing scoops that initiate jacket upset on impact with a fluidic target. The bullet having a forward component that minimally deforms and two lead cores behind the forward component.

In embodiments, the forward component having a nose portion configured as an ogival portion, a generally cylindrical forward portion, a rearward body portion that tapers forwardly and a pair of rearward most cylindrical portions. The jacket encompasses a core and extends forward to the cylindrical mid portion of the forward component and terminates at a leading edge portion. The jacket leading edge portion may have a taper oriented in a direction opposite the taper of the ogive portion of the forward component whereby a forward facing annular recess is provided. In embodiments, the leading edge is positioned rearwardly of the nose portion configured as an ogival surface portion of the forward component and forwardly of an ogival surface portion of the forward component. The leading edge of the jacket may be closer to the forward end, the tip, of the forward component than a forward edge of the cartridge casing.

The core may have two separate cores axially comprising lead stacked in the jacket. The lead cores may be of the same hardness and formulation or different hardness's and formulations. In embodiments, the jacket is in full engaging contact with the core, that is without gaps or air space.

In embodiments, the nose portion is formed of steel or other materials that are generally non-frangible and/or being minimally deformable upon impact of the bullet. In embodiments of the invention, the nose portion may be formed of materials such as ETP copper, copper alloys, brass, bronze, carbides, tungsten, tungsten carbide, silicon carbide, tungsten heavy alloys, aluminum, aluminum alloys, iron, polymers, polymer matrixes, fiber-reinforced polymers, carbon composite materials, and ceramics. In embodiments the core behind the forward may be lead, or other materials. In embodiments of the invention, the core material is more malleable than the nose portion. In embodiments of the invention the nose material is harder than the core material. The core behind the forward portion may be for example copper. Such a copper core may be separate or unitary with the jacket.

A feature and advantage of embodiments is that the forward component has a forward nose or ogival portion with an ogival surface, a second or mid ogival portion that has the longitudinal center of the bullet located therein, the second or mid ogival portion distinct from the forward ogival portion and a pair of cylindrical portions rearward of the rearward ogival portion. In embodiments, the rearward ogival portion tapers forwardly to a forward cylindrical portion from a second or mid cylindrical portion. A third or rearward cylindrical portion and a rounded end corner. The cylindrical mid portion being a maximum diameter portion of the forward component. The rearward cylindrical portion may be of a slightly less diameter than the cylindrical mid portion.

A feature and advantage of embodiments of the invention is that the jacket forward edge or lip engages the forward component such that the first ogival portion is forward of the jacket forward edge and the second ogival portion is rearward of the jacket forward edge. A substantially cylindrical forward portion, which may be positioned between the first and second ogival portions allowing an axial extending surface on the cylindrical forward portion where the jacket edge may engage providing flexibility and an increased tolerance during manufacturing for the positioning of the forward edge of the jacket.

A feature and advantage of embodiments is that the forward edge of the jacket has a reverse taper, opposite to that of the overall taper of the projectile. This reverse taper positioned at a cylindrical mid portion of forward component, presents a forward facing circumferential scoop which has minimal or no effect on flight characteristics but facilitates the initiation of the upsetting of the jacket on impact with a fluidic target. This further facilitates the stripping-off of the jacket from the steel component providing advantageous terminal effects such as fragmentation of the projectile and faster yawing. Both are associated with increased stopping power particularly where mushrooming bullets are not used. A further feature and advantage of embodiments is that a forward tapered portion of the jacket may have axially extending skives, that is, slits, grooves, or folds that may facilitate opening of the jacket upon impact.

In embodiments, a cartridge has a bullet with a forward component having a forward converging portion and a rearward portion positioned behind the forward converging portion and that extends to a rearward end of the bullet, the rearward portion that includes at least one cylindrical portion, and a jacket that has a forward jacket edge on the forward converging portion positioned with a tapering portion forward of the forward jacket edge and a tapering portion rearward of the forward jacket edge, the forward converging portion having a longitudinal length and a midpoint of the longitudinal length, and in embodiments, the forward jacket edge is positioned longitudinally within 20% of said midpoint of said longitudinal length of the tapering portion. In embodiments the forward converging portion having a centrally positioned cylindrical or substantially cylindrical portion.

A feature and advantage of embodiments is that the forward component is retained in the jacket forward of the lead core, the forward component having a forward ogive portion, a cylindrical forward portion adjoined to and unitary with the forward ogive portion, and a rearward portion adjoined to and unitary with the cylindrical mid portion, the entirety of the rearward portion diametrically larger than the cylindrical mid portion, the entirety of the cylindrical mid portion diametrically larger than the forward ogive portion.

A feature and advantage of embodiments is a bullet with a forward ogive portion with a forward ogive surface extends to a forward transition portion. The forward transition portion may have a forward transition portion surface. In embodiments the forward ogival portion surface may intersect the rearward ogival surface at a circular line or at a point when viewed in cross section. The transition portion then being at that point. In embodiments, the transition portion may be a cylindrical or frustoconical portion or substantially these geometric shapes, with a cylindrical or frustoconical forward transition portion surface. In embodiments, a portion of the forward ogival surface and forward transition portion surface defining a convex surface. Rearward of the forward ogival portion and the transition portion is a mid ogival portion and a cylindrical portion contiguous therewith. The forward transition portion connecting to a mid tapering portion with a mid tapering surface, the taper forward. The mid tapering portion surface presenting a convex surface. The mid tapering portion surface extending to a concave annular recess presenting a concave recess. A rearward portion adjoining the concave recess presents a convex surface.

In embodiments, forward to rearward, the front component has a convex region (the forward ogive), a concave region (transition from forward ogive to rearward tapered portion), and a convex region (the rearward tapered region) a concave region (the annular groove) and a convex region (the most rearward portion). The radius of curvature of the forward ogive portion is less that the radius of curvature of the rearward ogival portion. In embodiments each region may have compound curvatures.

In embodiments, the forward ogive portion defining a curvature that when continued on past a transition forward portion extends radially outward of a rearward ogival portion surface. The curvature of the rearward ogival portion surface defining a curvature that when extending forwardly past a transition portion is radially inward of the forward ogival portion surface. This configuration provides a contact surface for the jacket that has sufficient curvature for performance and securement of the forward component but also allows presentation of the annular scoop for facilitating opening of the jacket. Positioning the forward edge rearward of the forward ogival portion provides less air resistance from the leading edge compared to locating the forward leading jacket edge directly on the forward ogival portion. However, when impacting a fluidic target the placement of the leading edge rearwardly of the forward ogival portion is believed to have no or minimal impact on the upsetting effect of the scoop defined by the leading edge.

A feature and advantage of embodiments of the invention is that the forward ogived portion and forward cylindrical or transition portion of the forward component may have forward and outwardly facing cut-outs or divots that provide for a greater forward facing scooping area further enhancing the initiation of the opening of the jacket, the opening of the jacket, and the stripping off of the jacket from the forward component and allowing release of one or more core portions rearward thereof.

In embodiments, the bullet has an aspect ratio of the length of the bullet to its maximum diameter of greater than 3.0:1.0. That is, bullet length divided by bullet maximum diameter is less than 2.0. In embodiments of the invention, the bullet has an aspect ratio of the length of the bullet to its maximum diameter of greater than 3.5:1.0. In embodiments, the cartridge has an aspect ratio of cartridge length to bullet maximum diameter of about 6:1 or greater. In embodiments, the maximum diameter of the bullet is 0.50 inches. In embodiments the maximum diameter of the bullet is 0.45 inches. In embodiments the maximum diameter of the bullet is 0.36 inches.

Features and advantages of embodiments of the invention are increased accuracy and improved consistency in separation and/or fragmentation on terminal impact in a rifle cartridge.

A rifle cartridge with an improved bullet has desirable penetration capabilities, more consistent expansion, and controlled separation of components upon terminal impact.

DETAILED DESCRIPTION

Figure 17:
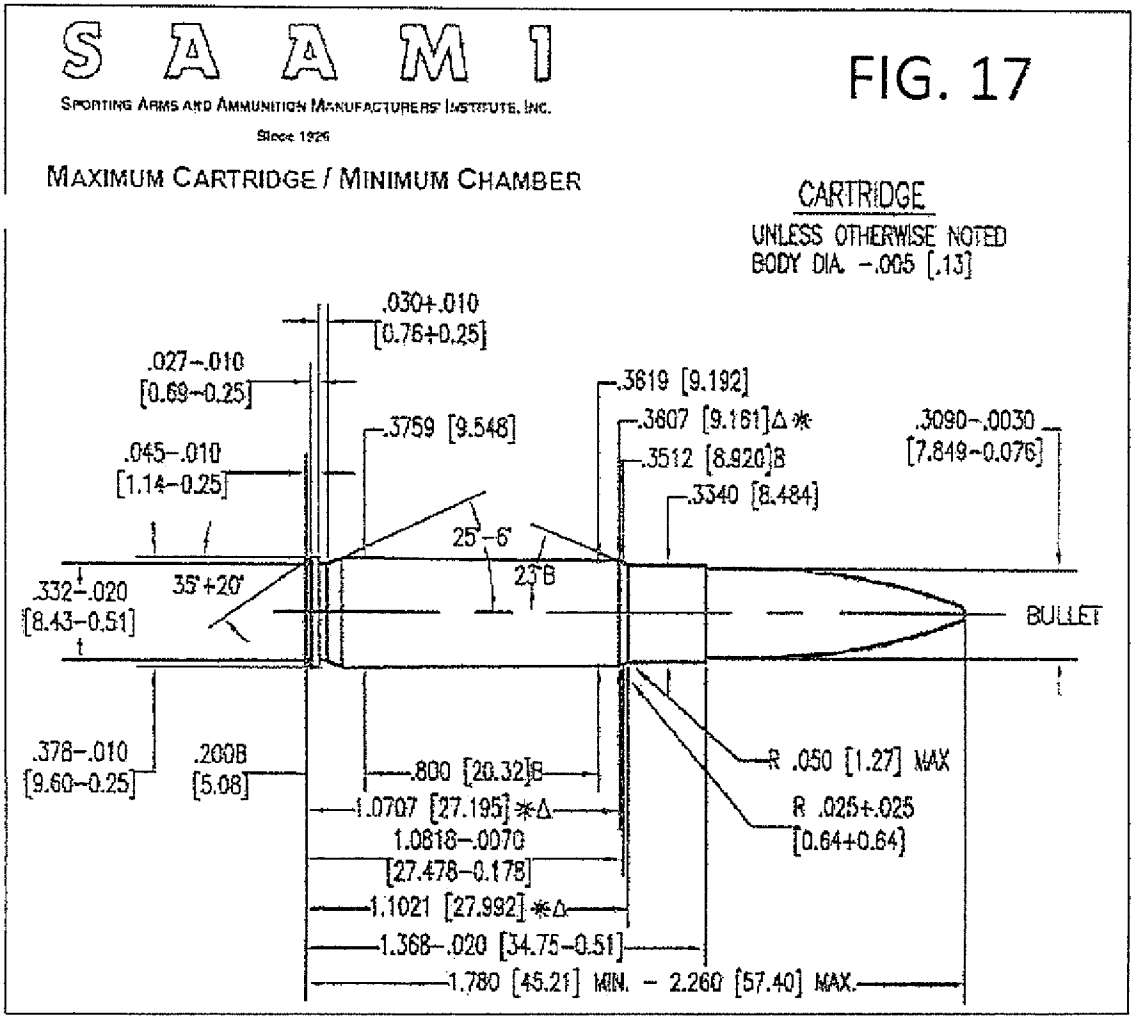
FIG. 17 is the SAAMI specifications for the 300 BLK cartridge.

Referring to FIGS. 1-4, a cartridge 20 suitable for a rifle, for example a 300 BLK (also known as the .300 Blackout), has a bullet 22, a necked casing 24 with a mouth 25, propellant 30, and a primer assembly 34. The casing 24 has a rim 35 at a casing head 32, a reduced diameter neck portion 33, and a wall portion 36 having a diameter 36.2. Suitable overall dimensions are illustrated in the Sporting Arms and Ammunition Manufacturers Institute, Inc. (SAAMI) specification of FIG. 17. The inventive aspects are suitable for other cartridges than the 300 BLK. For different sized bullets and cartridges, the dimensions will vary proportionally. In embodiments, the rim diameter is the same as the wall portion diameter or may be greater. In other embodiments, there is no reduced diameter neck portion and the rim is a flange that extends outwardly from the wall portion.

Figure 1:
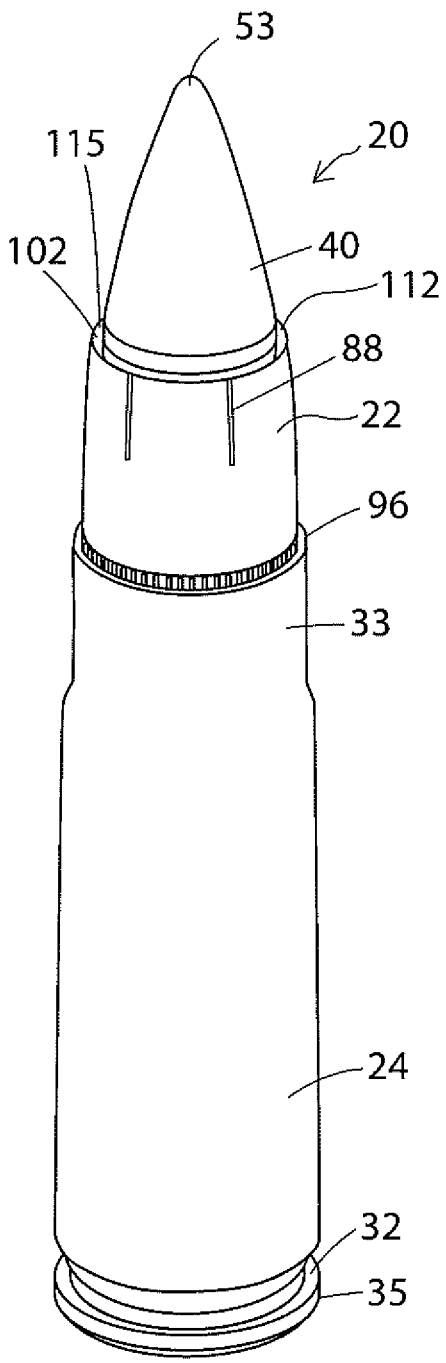
FIG. 1 is a front perspective view of a cartridge according to embodiments of the invention.
Figure 2:
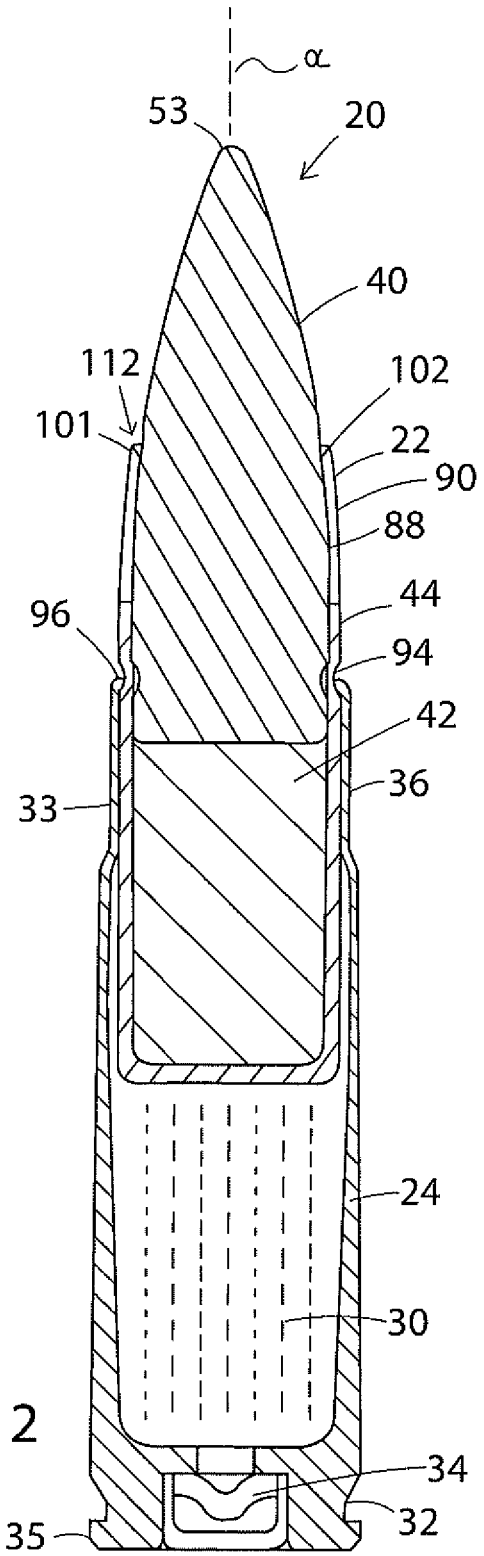
FIG. 2 is a cross-sectional view of the cartridge of FIG. 1.
Figure 3:
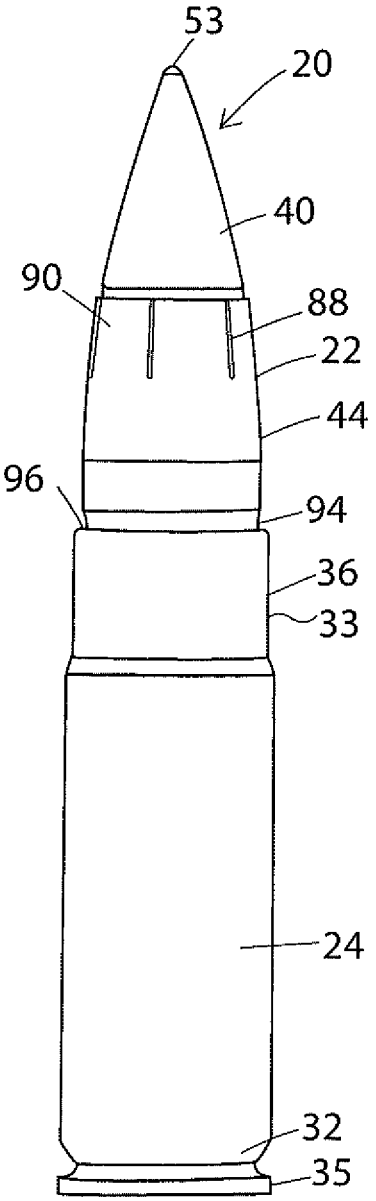
FIG. 3 is an elevational view of another cartridge according to embodiments.
Figure 4:
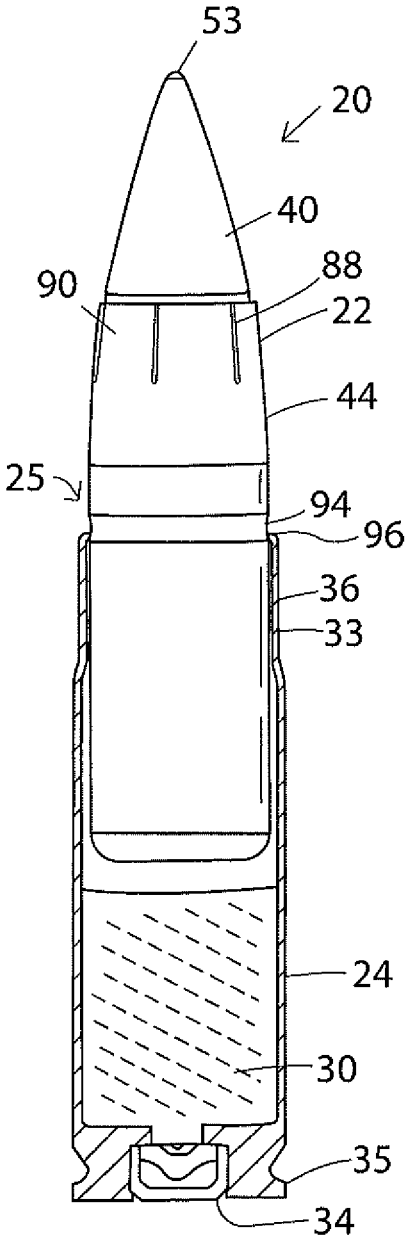
FIG. 4 is a partial cross-sectional view of the cartridge of FIG. 3.
Figure 5:
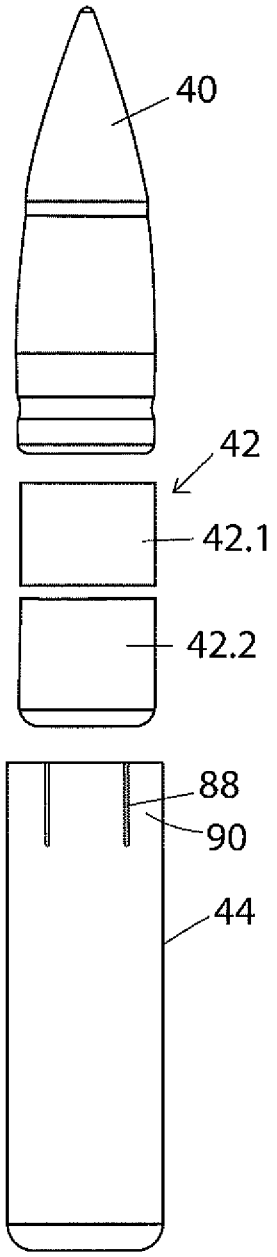
FIG. 5 is an exploded view of a projectile according to embodiments.
Figure 6:
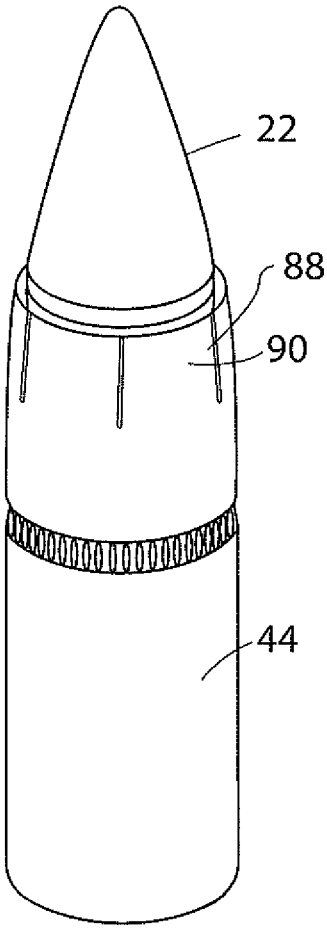
FIG. 6 is a perspective view of a bullet according to embodiments.
Figure 7:
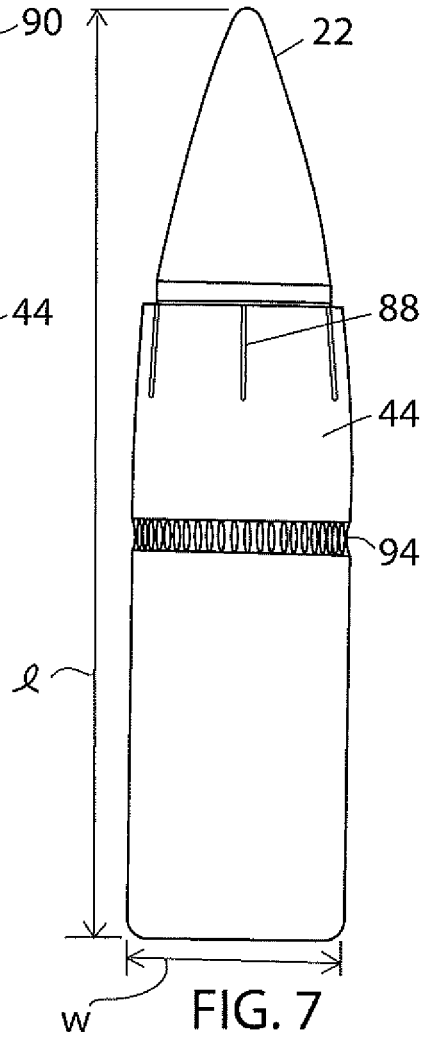
FIG. 7 is a front elevational view of the bullet of FIG. 6.
Figure 8A:
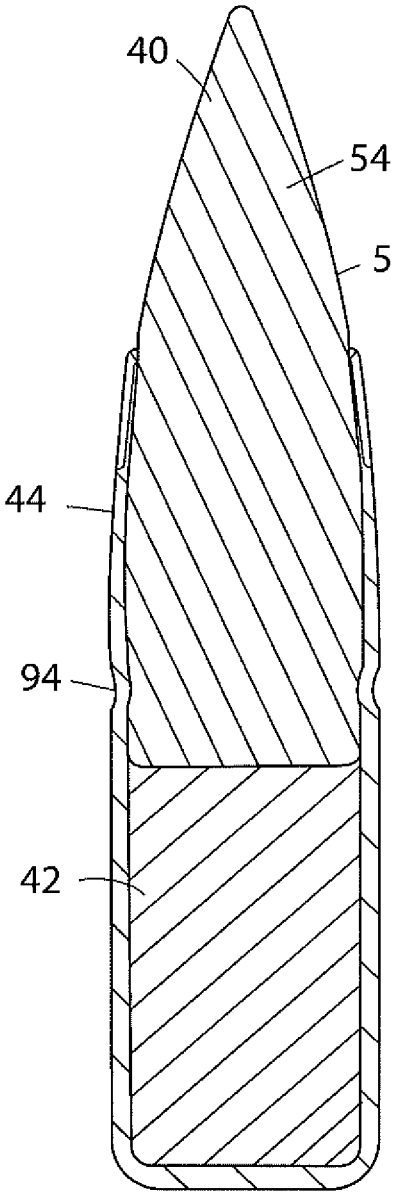
FIG. 8A is a cross-sectional view of an embodiment of a bullet.
Figure 8B:
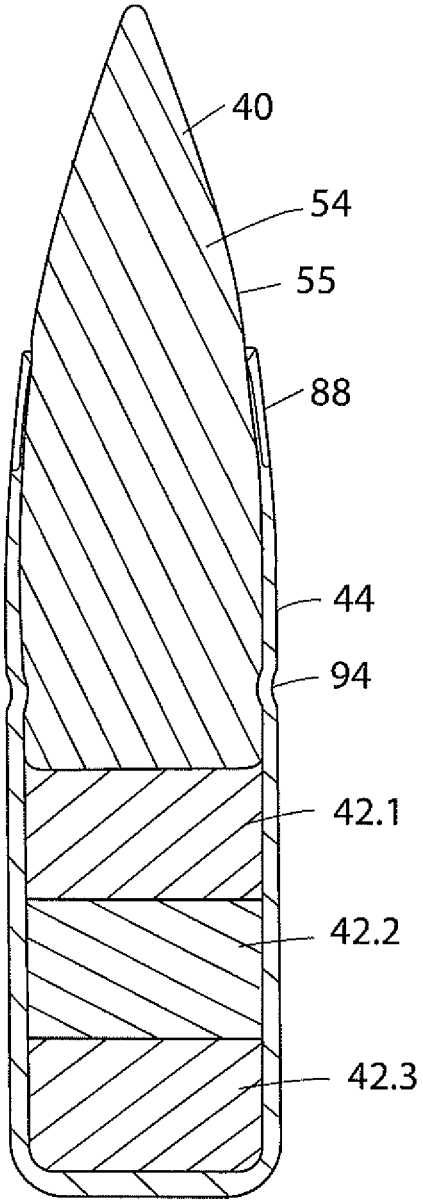
FIG. 8B is a cross-sectional view of an embodiment of a bullet.
Figure 8C:
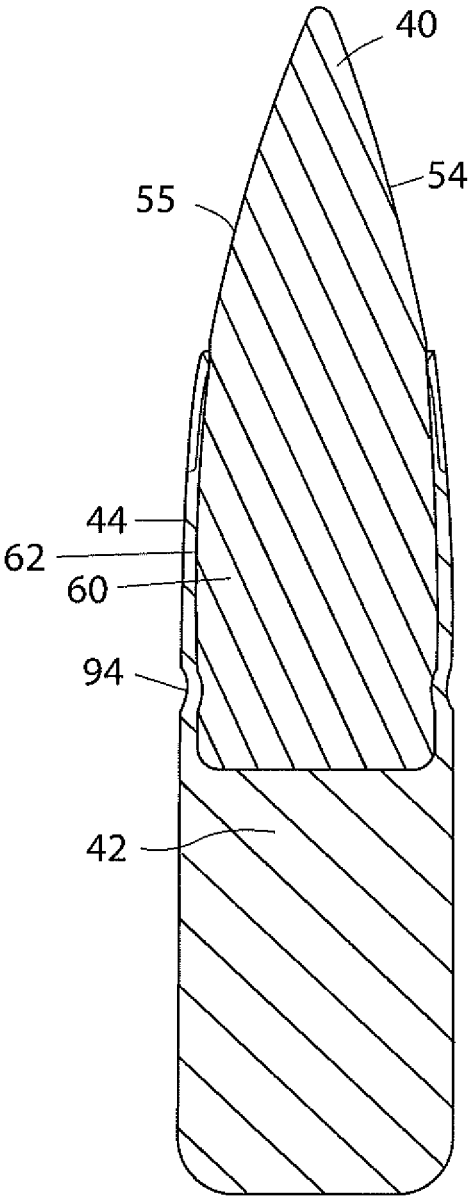
FIG. 8C is a cross-sectional view of an embodiment of a bullet.
Figure 8D:
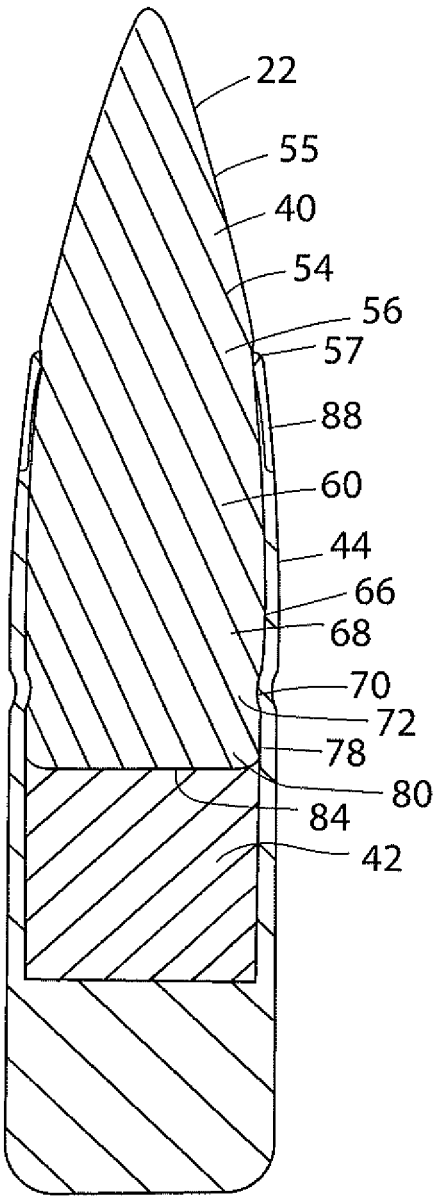
FIG. 8D is a cross-sectional view of an embodiment of a bullet.
Figure 9:
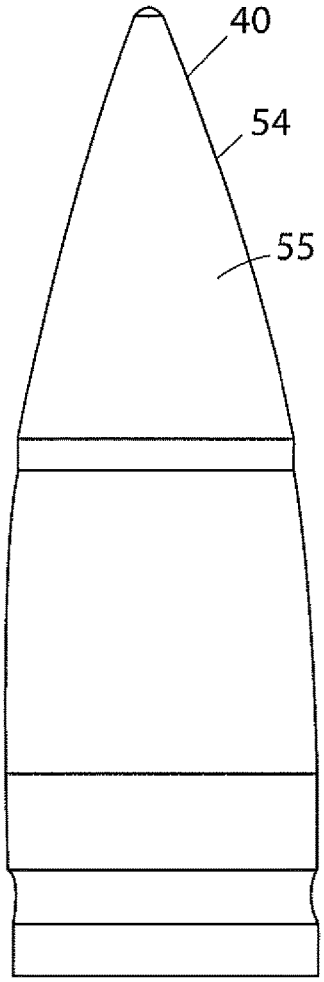
FIG. 9 is a side elevational view of a forward component according to embodiments.
Figure 10:
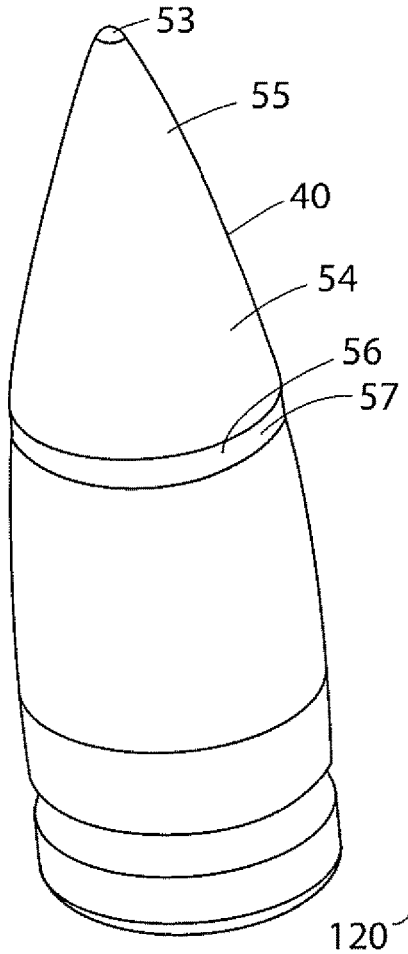
FIG. 10 is a front perspective view of the forward component of FIG. 9.
Figure 11:
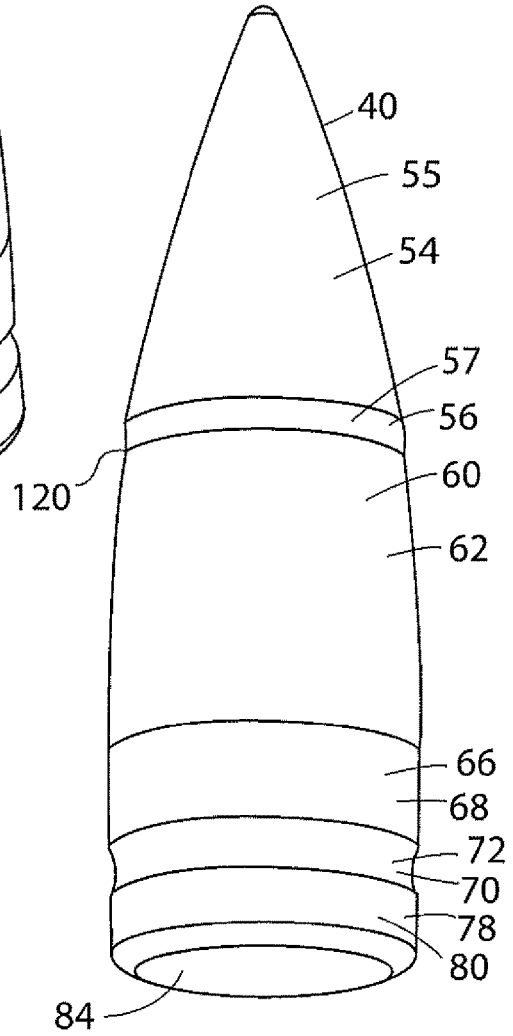
FIG. 11 is a front perspective view of the forward component of FIGS. 9 and 10.

Referring to FIGS. 1-8D, the rifle bullet is comprised of a forward component 40, a core 42, and a jacket 44. In embodiments, the core 42 may be a single unitary core, formed of lead or other materials, or may comprise two or more stacked cores 42.1, 42.2, 42.3. The core 42 may be unitary with the jacket 44 and comprise copper or a coper alloy as illustrated in FIG. 8C. The core and jacket may be formed of copper or copper alloys. The forward component may be formed of steel or other materials such as: ETP copper, copper alloys, brass, bronze, carbides, tungsten, tungsten carbide, silicon carbide, tungsten heavy alloys, aluminum, aluminum alloys, iron, polymers, polymer matrixes, fiber-reinforced polymers, carbon composite materials, and various ceramics In embodiments, the core is not bonded to the jacket, allowing separation therefrom. The bullet may have in embodiments an aspect ratio of length to maximum diameter of 3.5:1 (or simply "3.5") or greater. In embodiments, the bullet may have an aspect ratio of length to maximum diameter of 4.0:1.0 (or simply "4.0") or greater. The applicants have discovered that having 2 separable lead cores as shown in FIGS. 2, 5, and 13A, as opposed to a single lead core, the bullet has more uniform fragmentation performance in gelatin penetration tests, that is, the bullet fragments do not travel as far into or through the gelatin, 19 inches vs. 24 inches. This consistent fragmentation provides more uniform energy transfer to the target. Referring to FIGS. 8A-12, in embodiments, the forward component 40 of the rifle bullet 22 has a tip 53 and a first or forward ogival portion 54 with a forward ogival portion surface 55, a transition forward portion 56 with a transition adjoining and unitary with the forward ogival portion. The mid portion may be configured as a first or forward cylindrical portion 56 with a forward cylindrical portion surface 57. A second or mid ogival portion 60 with a mid ogival surface 62 is contiguous with the forward cylindrical portion 56 and surface 57. A second or mid cylindrical surface 66 of a first or mid cylindrical portion 68 is rearward of and contiguous with the mid ogival surface 62. The mid cylindrical surface 66 extends to an annular recess surface 70 of an annular recessed portion 72, the recessed portion may have a smooth radiused curvature and extends longitudinally a distance of 0.04 to 0.10 inches. In embodiments the recess extends longitudinally a distance greater than 4% of the length L1 of the forward component and less than 10% the length L1. The recess can extend inwardly from the mid cylindrical portion surface 0.02 to 0.10 inches in embodiments. A third or rearward cylindrical surface 78, of a third or rearward cylindrical portion 80, adjoins the annular recessed portion 72 and extends to a rearward facing end surface 84.

Figure 12:
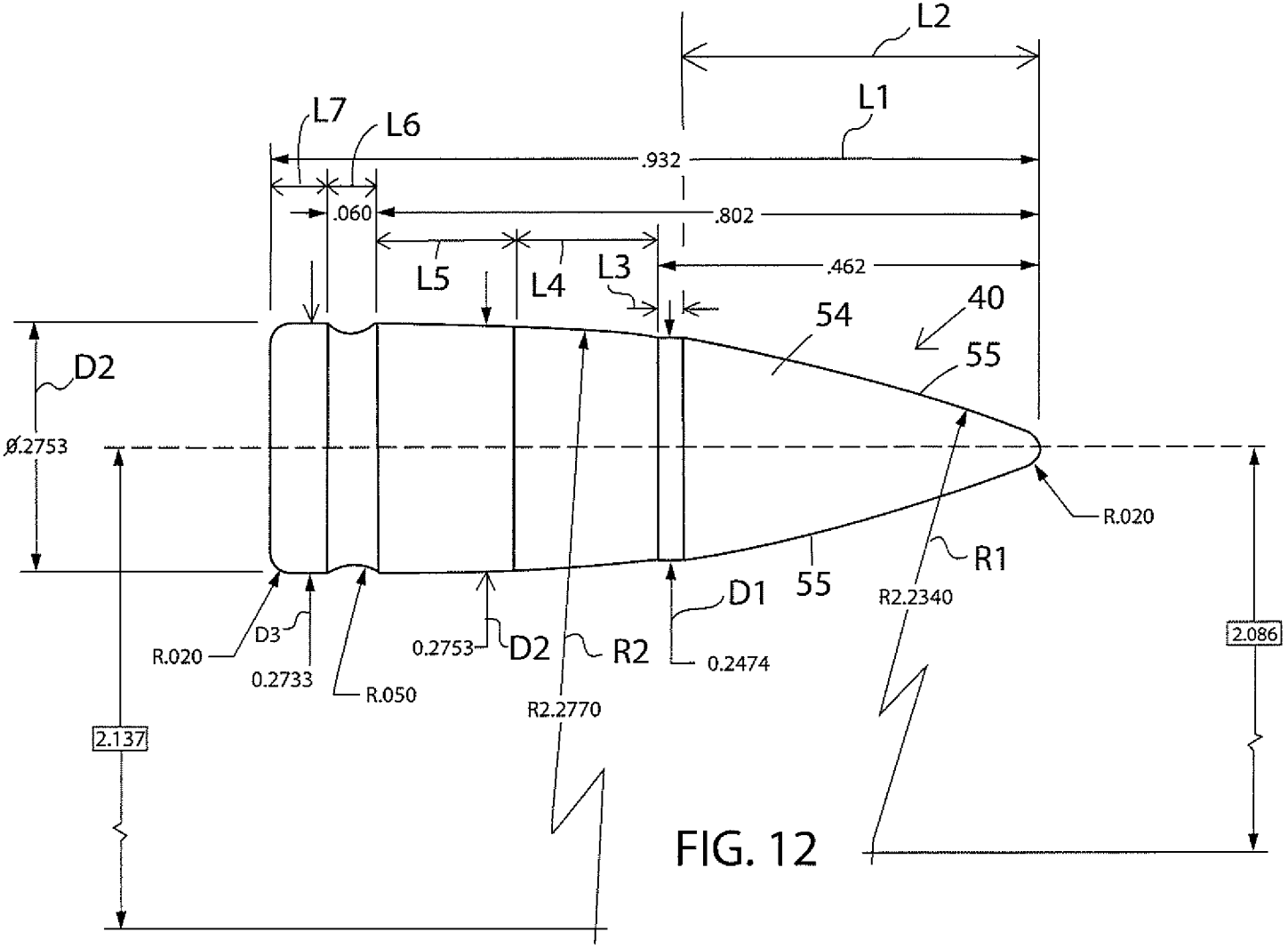
FIG. 12 is an elevation view of a forward component with suitable dimensions according to embodiments.
Figure 13A:
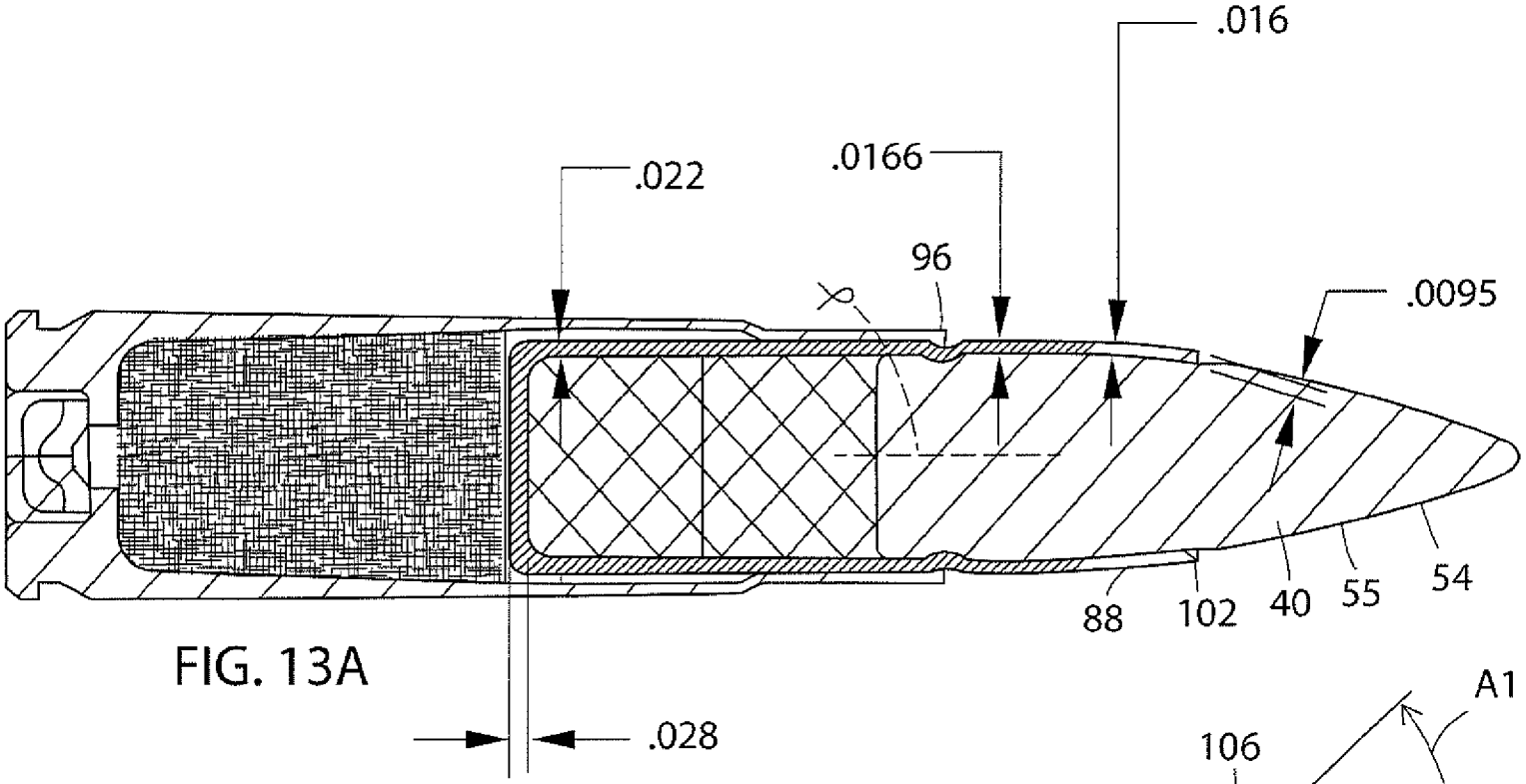
FIG. 13A is a cross-sectional view of a bullet according to embodiments illustrating a varying jacket thickness and forward scoop.

Referring in particular to FIG. 12, the forward ogival portion, the first or forward cylindrical portion 56, the mid ogival portion, the second or mid cylindrical portion 68, the annular recess portion 72, and the third or rearward cylindrical portion 80 all being unitary with one another. In embodiments, the diameter D2 of the second cylindrical portion 68 being greater that the diameter D1 of the first cylindrical portion 56. In embodiments, the diameter D2 of the second cylindrical portion 68 being greater than the diameter D3 of the third cylindrical portion 80. In embodiments, the diameter of the third cylindrical portion 80 being greater than the diameter D1 of the first cylindrical portion 56.

The forward component 40 has an axial length L1, and the forward ogive portion extends an axial distance of L2, the cylindrical mid portion an axial distance of L3, the mid ogival portion a distance L4, the mid cylindrical portion an axial distance L5, the annular recess portion a distance L6, and the rearward cylindrical portion a distance L7.

In embodiments the second or mid ogival portion begins at a longitudinal mid position of the forward component, in embodiments, within 5% of the midpoint of the total length of the forward component. In embodiments, within 8% of the midpoint of the total length of the forward component. In embodiments, the diameter of the rearwardly most cylindrical portion is within 2% of the diameter of the mid cylindrical portion. In embodiments, the diameter of the rearwardly most cylindrical portion is within 5% of the diameter of the mid cylindrical portion. In embodiments, the diameter of the rearwardly most cylindrical portion is within 1% of the diameter of the mid cylindrical portion.

As best illustrated in FIG. 12, the first ogival portion may have a first radius of curvature R1 that is less that the radius of curvature R2 of the second ogival portion rearward of the first or forward ogival portion. In embodiments of the invention, each dimension of FIG. 12 may be considered an inventive aspect with reference to or compilation with other dimensions and the specific dimensions may have a range of 10% of the specific given dimensions.

The forward components may be formed of steel, aluminum, and other materials as provided herein. The jacket may comprise copper and the core may comprise lead. In embodiments the core can also be copper and may be unitary with the jacket. The bullets herein may also be formed of other materials other than those specifically identified.

In embodiments, the forward component is retained in the jacket forward of the lead core, the forward component having a forward ogive portion, a cylindrical mid portion adjoined to the forward ogive portion, and a rearward portion adjoined to the cylindrical mid portion, the entirety of the rearward portion diametrically larger than the cylindrical mid portion, the entirety of the cylindrical mid portion diametrically larger than the forward ogive portion, In embodiments, the diameter D1 of the forward cylindrical portion is 80 percent or greater of the diameter D2 of the maximum diameter portion which is the mid cylindrical portion of the forward component. In embodiments, the diameter of the forward cylindrical portion is 85 percent or greater of the diameter of the maximum diameter portion and less than 92% of the diameter of the maximum diameter portion.

In embodiments the ratio of the length of the forward component to the maximum diameter of the forward component is in the range of 3.0 to 3.6. In embodiments the ratio of the length of the forward component to the diameter of the forward component is in the range of 2.9 to 4.0. In embodiments the ratio of the length of the forward component to the diameter of the forward component is in the range of 3.2 to 3.5.

In embodiments, the mid cylindrical portion rather than being cylindrical, may have a slight taper forwardly of, for example, 2 degrees or less, as measured from a line parallel to the axis. In embodiments the mid cylindrical portion may be conical with a taper of 5 degrees or less, as measured from a line parallel to the axis. Such conical mid portions may be substituted for all embodiments described or claimed herein.

Referring to FIGS. 1-8D, the jacket may have scores or skives 88 extending axially on the forward portion 90 of the jacket. The skives may be cuts extending partially or completely through the jacket, folds in the jacket, indentations in the jacket, or other weakening of the jacket axially to facilitate tearing and opening of the jacket. U.S. Pat. Nos. 6,805,057 and 6,305,292 illustrate such skives and these patents are incorporated herein by reference for all purposes. The jacket may further be crimped inwardly or otherwise deformed into the annular recess as illustrated providing a cannelure 94. This will effectively maintain the bullet within the jacket until terminal impact and further provides an anchor location, the cannelure, to which the top edge 96 of the casing may be crimped to secure the bullet into the casing. In embodiments, the reduced diameter of the rearward cylindrical portion provides an enhanced transition of the jacket portion rearward of the cannelure into the cannelure. Additionally, as best shown in FIG. 13A, the jacket thickness may increase in a rearward direction so that the reduced diameter of the rearward cylindrical portion can compensate for the increasing thickness of the jacket and thereby maintain more uniform obturating contact with the barrel when the bullet is fired.

Figure 13B:
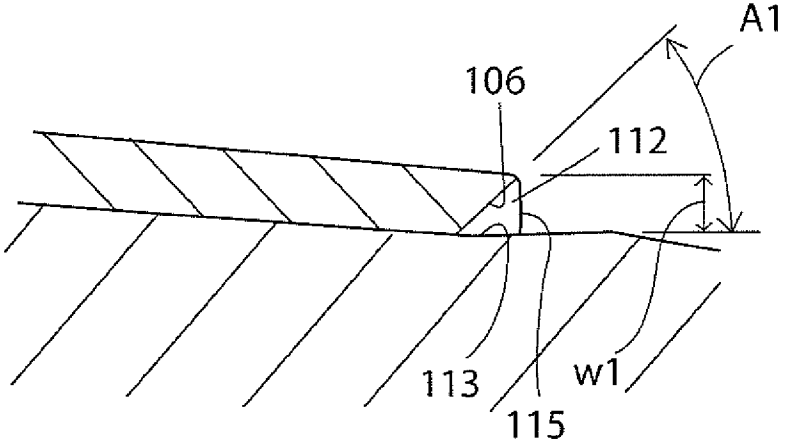
FIG. 13B is a detailed enlarged of a forward scoop in accord with embodiments.
Figures 14, 15, 16:
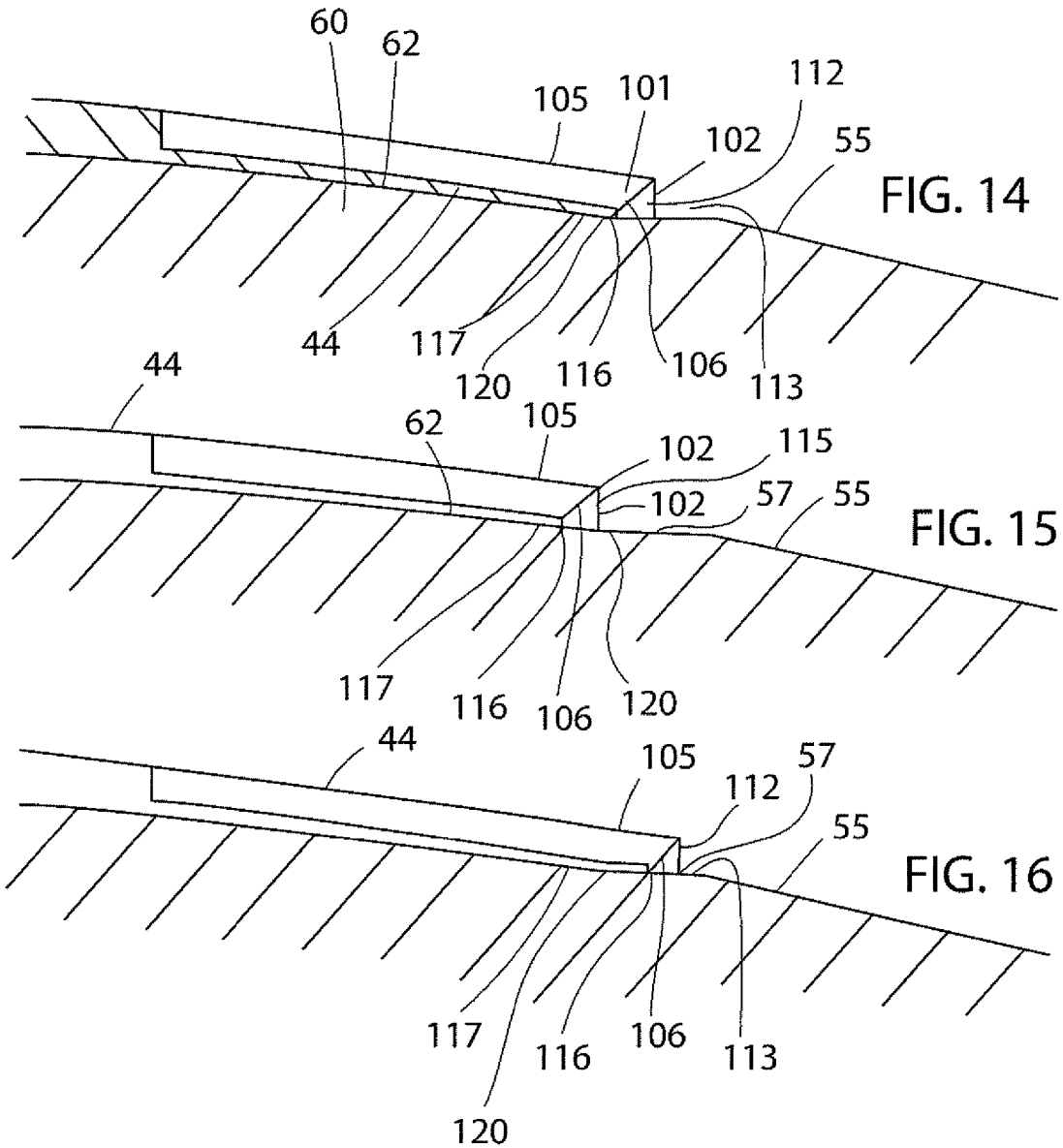
FIG. 14 is a detailed cross-sectional view of the forward edge of the jacket engaged with the forward component.
FIG. 15 is a detailed cross-sectional view of the forward edge of the jacket engaged with the forward component.
FIG. 16 is a detailed cross-sectional view of the forward edge of the jacket engaged with the forward component.

Referring to FIGS. 1, 8A-8D, and 13A-16, the jackets for the bullets have leading edge portions 101 with a leading edge 102. The outward corner of the jacket defines the leading edge, the juncture of the exterior surface 105 of the jacket and the beveled or tapered surface 106 that may be a frustoconical and/or concave surface. This surface faces inwardly and forwardly with respect to the bullet axis $\alpha$. The leading edge provides a sharp pointed circular blade as the edge. The surfaces 105, 106 defining the edge may be at an angle A1 of less than 60°. The surfaces defining the edge may be at an angle of less than 70°. The surfaces defining the edge may be at an acute angle. An annular recess 112 is defined between the bevel surface 106 of the leading edge portion and the exterior surface 113 of the forward component. The recess may be V-shaped in cross-section, faces forward and defining a circumferential scoop 115. The scoop is exposed axially, when viewed from the front of the bullet, the scoop is a ring. In embodiments, one leg of the V is directly in line with the axis $\alpha$ of the bullets as well as the trajectory path of the bullet. The V-shaped recess promotes upsetting of the jacket when the bullet impacts fluidic material which then urges the jacket to open, essentially by hydraulic force. The opened jacket can release the forward component and also the cores behind it maximizing the transfer of kinetic energy to the target and increasing the damage imparted to the target. The leading edge may be positioned such that the forward end 116 of the interior surface 117 of the jacket 44 is positioned at or about at the juncture 120 between the forward cylindrical portion surface 57 and the mid ogival portion surface 62 as illustrated in FIG. 14. That is, the jacket contact terminates at or about the juncture between the mid ogival portion surface and the forward cylindrical portion surface 57. FIG. 15 illustrates the termination of the jacket contact on the mid ogival portion surface. FIG. 16 illustrates the termination of the jacket contact as being on the forward cylindrical portion surface 57.

As best illustrated in FIGS. 13A and 13B, the width W1 of the forward scoop measured radially on a plane perpendicular to the bullet axis $\alpha$ may be substantially the jacket thickness or slightly less at the forward edge applicable to, for example, a 300 BLK embodiment. In embodiments the radially measured scoop width W1 is 0.007 to 0.022 inches. In embodiments the radially measured scoop width W1 is 0.006 to 0.035 inches. In embodiments the radially measured scoop width W1 is 0.0085 to 0.0150 inches. For different sized bullets and cartridges, the dimensions will vary proportionally.

Figure 18:
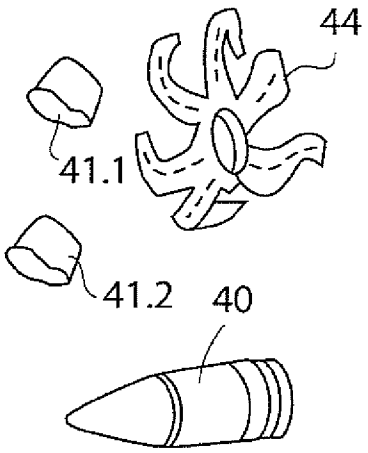
FIG. 18 is a depiction of a bullet in accord with embodiments after terminal contact with a fluidic target.

Referring to FIG. 18, the bullet 40 after terminal impact in a fluidic target is depicted. The jacket 44 more readily peels from the forward component 40 of the bullet than conventional ammunition, and the dual core 41.1, 41.2, particularly when it is a lead core, more readily separates from the jacket, providing four or more separated components. In many cases the lead core and jacket will further fragment into additional pieces.

The following U.S. patents and publications are incorporated by reference herein for all purposes.

U.S. Pat. No. 9,863,746
U.S. Pat. No. 8,950,333
U.S. Pat. No. 6,805,057
U.S. Pat. No. 6,732,657
U.S. Pat. No. 6,374,743
U.S. Pat. No. 4,517,898

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment (s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes. With respect to the dimensions herein, invention extends to any combinations of the given dimensions and such dimensions are hereby defined to include ±10% of the given dimension. In embodiments, the given dimensions are hereby defined to include the range of dimensions of ±20% of the specified dimensions.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. A rifle cartridge comprising a cartridge casing with a mouth and an interior, propellant in the interior of the cartridge casing, and a bullet secured in the mouth of the cartridge casing, the bullet comprising:

a forward component, the forward component comprising a forward ogival portion with a forward ogival surface, the forward ogival portion terminating at a forward tip, *a forward cylindrical portion rearward of the forward ogival portion, and* a mid ogival portion rearward of the forward [ogival] *cylindrical* portion, the mid ogival portion comprising a mid ogival surface[, and a rearward cylindrical portion rearward of the mid ogival portion]; and a jacket [defining a cup,] *configured to receive* the forward component[seated in the cup], the jacket comprising a leading edge defining an annular scoop, wherein the annular scoop is defined by the leading edge portion and *tapered rearward toward* the *forward* cylindrical [mid] portion [defining] *to define* a forward facing annular recess.

2. The rifle cartridge of claim 1 wherein the forward component has a juncture between a forward cylindrical portion surface and the mid ogival portion, and wherein the leading edge of the jacket is positioned adjacent the juncture.

3. The rifle cartridge of claim 1 wherein the leading edge of the jacket is positioned intermediate the forward ogival portion and the mid ogival portion.

4. The rifle cartridge of claim 3 further comprising a lead core positioned rearwardly of the forward component, wherein the lead core has at least two axially aligned portions with a separation plane therebetween.

5. The rifle cartridge of claim 1, where in the jacket has a thickness that reduces forwardly and wherein [the] *a* rearward cylindrical portion *rearward of the mid ogival portion* has a smaller diameter than a mid cylindrical portion accommodating a thicker jacket at the rearward cylindrical portion.

6. The rifle cartridge of claim 1, wherein an annular recess between [the] *a* rearward cylindrical portion *rearward of the mid ogival portion* and a mid cylindrical portion has a radius that extends [the] *an* entire longitudinal length of the annular recess and the annular recess extends entirely circumferentially around the forward component.

7. The rifle cartridge of claim 6 wherein the *annular* recess is at least 0.025 inches deep with respect to *a surface of* the mid cylindrical portion[surface].

8. The rifle cartridge of claim 1, wherein the leading edge [portion] of the jacket is positioned between the forward ogival surface and the mid ogival surface of the forward component, the leading edge having a radial width of 0.007 to 0.022 inches exposed axially when viewed from the front.

9. The rifle cartridge of claim 1 wherein the *cartridge* casing and *the* bullet are conformingly sized as a 300 BLK cartridge.

10. The rifle cartridge of claim 1, further comprising a lead core positioned rearwardly of the [jacket] *forward component*; and the jacket [comprising a leading edge] defining an annular scoop configured to facilitate upset of the jacket upon impact with a target, the *cartridge* casing having a forward lip positioned at [the] *a* cannelure in the jacket.

11. A rifle bullet comprising:

a forward unitary component, the forward unitary component having a forward tapering portion with a forward tip *and defining a forward ogival surface, a forward cylindrical surface rearward of the forward ogival surface, a mid cylindrical surface separated from the forward cylindrical surface, a rearward cylindrical surface separated from the mid cylindrical surface*;

at least one core engaging the forward unitary component; and a jacket that encompasses the at least one core and tapers conformingly around the *forward* tapering portion of the forward *unitary* component, *wherein the forward unitary component is partially contained in the jacket,* the jacket having a leading edge spaced rearwardly from the forward tip of the [bullet] *forward unitary component* and having a taper opposite that of the *forward* tapering portion of the forward *unitary* component, the leading edge having a radial width exceeding that of the *forward* tapering portion, the leading edge exposed axially when viewed from the front of the rifle bullet.

12. The rifle bullet of claim 11 wherein the forward tapering portion comprises two ogival portions, each ogival portion having a different ogival curvature, the two ogival portions meeting at a transition portion.

[13. The rifle bullet of claim 11 wherein the forward component is partially contained in the jacket, the forward component having a forward cylindrical surface rearward of a forward ogival surface, a mid cylindrical surface separated from the forward cylindrical surface, a rearward cylindrical surface separated from the mid cylindrical surface.]

14. The rifle bullet of claim 11, further comprising a casing and *a* propellant, the *rifle* bullet seated in a mouth of the casing with the propellant in the casing, wherein the casing and *the rifle* bullet are conformingly sized as a 300 BLK cartridge.

15. A rifle bullet comprising a forward component partially contained in a jacket, the forward component, when viewed in cross section comprising a forward longitudinally extending first convex region, a longitudinal first concave region adjoining and rearward of the first convex region, a second convex region rearward of and adjoining the first concave region, a second concave region rearward of and adjoining the second convex region, and a third convex region rearward of and adjoining the second concave region, *wherein the first convex region and the second convex region meet at a cylindrical portion*;

the jacket comprising a leading edge positioned adjacent the first convex region, the leading edge defining an annular [scoop] *recess*, wherein the annular [scoop] *recess* is exposed axially when viewed from the front of the rifle bullet.

16. A cartridge comprising the rifle bullet of claim 15, further comprising a casing and propellant, wherein the *rifle* bullet seated in a mouth of the casing with a propellant in the casing, wherein the casing and *the rifle* bullet are conformingly sized as a 300 BLK cartridge.

17. The rifle bullet of claim 15 wherein [the first and second convex regions] *the first convex region and the second convex region* each have a different ogival curvature[, the first and second convex regions meeting at a cylindrical portion].

18. The rifle bullet of claim 17, wherein the jacket thickens rearwardly.

19. The rifle bullet of claim 15 wherein the annular [scoop] *recess* has a radial width of 0.007 to 0.022 inches.

*20. The rifle cartridge of claim 1 wherein the jacket defines one or more skives extending axially on a forward portion of the jacket.*

* * * * *